(12) United States Patent
Nara et al.

(10) Patent No.: US 10,909,270 B2
(45) Date of Patent: Feb. 2, 2021

(54) INFORMATION PROCESSING DEVICE, MOBILE OBJECT, INFORMATION PROCESSING METHOD, AND COMPUTER PROGRAM PRODUCT

(71) Applicant: KABUSHIKI KAISHA TOSHIBA, Minato-ku (JP)

(72) Inventors: Ryuta Nara, Fuchu (JP); Takeshi Kawabata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 165 days.

(21) Appl. No.: 16/285,271

(22) Filed: Feb. 26, 2019

(65) Prior Publication Data

US 2020/0012820 A1   Jan. 9, 2020

(30) Foreign Application Priority Data

Jul. 9, 2018 (JP) ................................ 2018-129598

(51) Int. Cl.
*G06F 21/74* (2013.01)
(52) U.S. Cl.
CPC ...... *G06F 21/74* (2013.01); *G06F 2221/2149* (2013.01)
(58) Field of Classification Search
CPC .................. G06F 21/74; G06F 2221/2149
See application file for complete search history.

(56) References Cited

U.S. PATENT DOCUMENTS

| 9,219,845 | B2 * | 12/2015 | Watanabe .......... H04N 1/00326 |
| 2006/0005188 | A1 | 1/2006 | Vega et al. |
| 2015/0089213 | A1 * | 3/2015 | Isozaki ................ H04L 9/0891 |
| | | | 713/155 |
| 2018/0081712 | A1 | 3/2018 | Kanai et al. |
| 2018/0239896 | A1 * | 8/2018 | Kato ......................... G06F 8/65 |
| 2019/0171585 | A1 | 6/2019 | Yonemura et al. |

FOREIGN PATENT DOCUMENTS

| JP | 4806212 | 11/2011 |
| JP | 2017-142722 | 8/2017 |
| JP | 2018-045638 | 3/2018 |
| JP | 2019-101750 A | 6/2019 |

* cited by examiner

*Primary Examiner* — Terrell S Johnson
(74) *Attorney, Agent, or Firm* — Oblon, McClelland, Maier & Neustadt, L.L.P.

(57) ABSTRACT

According to an embodiment, an information processing device switching between a secure mode and a non-secure mode to operate, includes one or more processors configured to perform: implementing a secure OS which operates in the secure mode; implementing a non-secure OS which operates in the non-secure mode; acquiring initialization process information autonomously in the secure mode, the initialization process information relating to an initialization process which the non-secure OS executes for a shared resource shared by the secure OS and the non-secure OS; and enabling, based on the initialization process information, the shared resource to be shared and used by the secure OS and the non-secure OS.

15 Claims, 7 Drawing Sheets

FIG.4

CACHE SETTING INFORMATION 18A

| SETTING ITEM | RESPONSIBILITY INFORMATION | SETTING LOCATION | SETTING VALUE |
|---|---|---|---|
| CACHE CONTROLLER EN BIT | NS | 1-ST BIT OF 15-TH COPROCESSOR | 1 |
| CACHE CONTROLLER DEBUG BIT | S | 1-ST BIT OF ADDRESS 0xFF00FF10 | 1 |
| CACHE CONTROLLER DEBUG BIT | NS | 1-ST BIT OF ADDRESS 0xFF001010 | |
| | | | |
| | | | |
| | | | |

FIG.5

SETTING MANAGEMENT INFORMATION 22C

| SETTING ITEM | RESPONSIBILITY INFORMATION | SETTING LOCATION | INITIAL SETTING VALUE | SET INFORMATION |
|---|---|---|---|---|
| CACHE CONTROLLER EN BIT | NS | 1-ST BIT OF 15-TH COPROCESSOR | 1 | SET |
| CACHE CONTROLLER DEBUG BIT | S | 1-ST BIT OF ADDRESS 0xFF00FF10 | 1 | SET |
| CACHE CONTROLLER DEBUG BIT | NS | 1-ST BIT OF ADDRESS 0xFF001010 | 1 | NOT SET |
| | | | | |
| | | | | |
| | | | | |

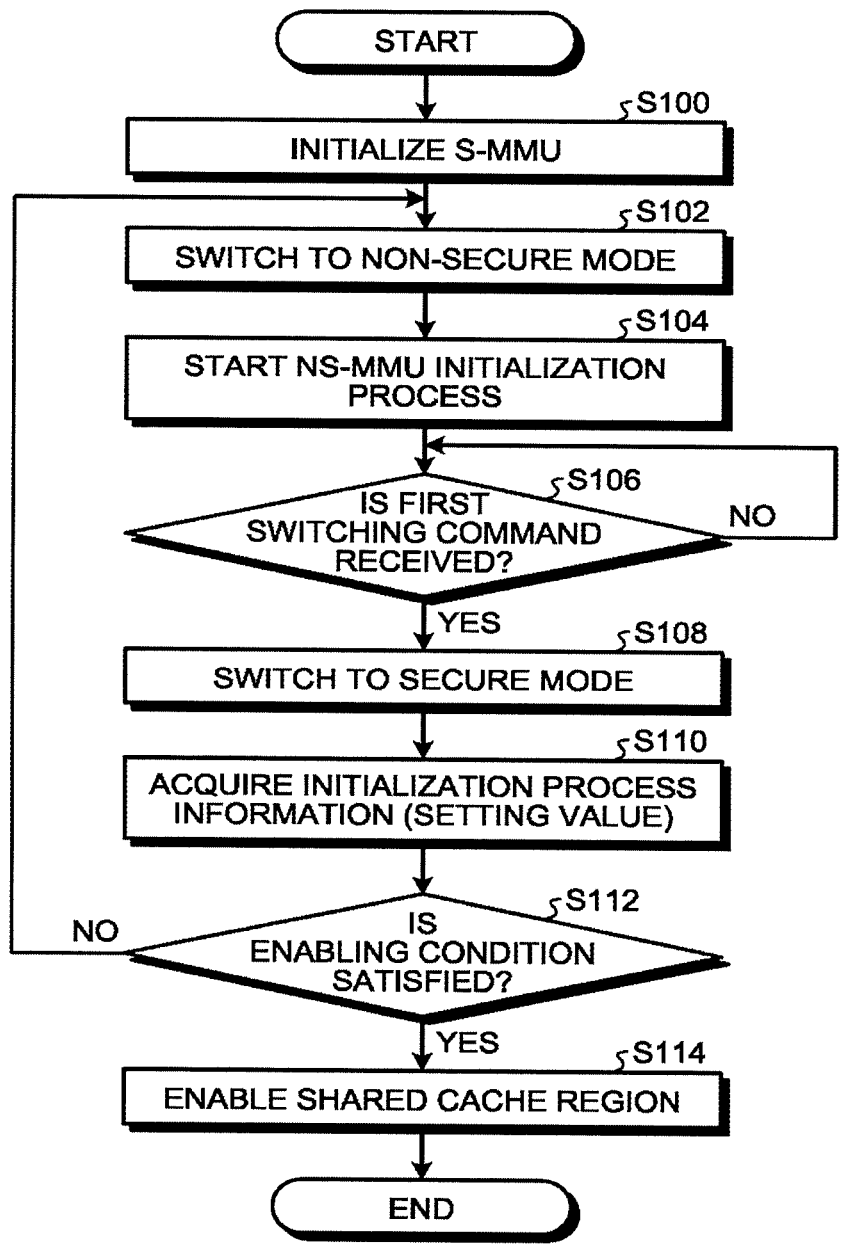

INFORMATION PROCESSING DEVICE, MOBILE OBJECT, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-129598, filed on Jul. 9, 2018; the entire contents of which are incorporated herein by reference.

FIELD

Embodiments described herein relate generally to an information processing device, a mobile object, an information processing method, and a computer program product.

BACKGROUND

Hitherto, a virtualization technique of information processing device has been known. Using the virtualization technique, it is possible to execute a plurality of operating systems (OSs) in parallel through a single information processing device. Further, a technique of switching an OS using a virtualization technique has been disclosed. For example, a technique of switching between an OS operating in a secure mode with a higher security and an OS operating in a non-secure mode with a low security has been known.

Each of a plurality of OSs executes an initialization process of each execution environment or settings of resources to be used at the time of activation. Specifically, in order to ensure reliability, a secure OS operating in a secure mode executes an initialization process, and then a non-secure OS operating in a non-secure mode executes an initialization process. Here, for enabling a shared resource shared between the secure OS and the non-secure OS, it is necessary for the secure OS to be on standby until a signal indicating that the non-secure OS side reaches a stage in which a shared resource can be enabled, from the non-secure OS. For this reason, in the related art, it is necessary to execute a process related to enabling the shared resource in accordance with the signal output from the non-secure OS with a low security, leading to a decrease in reliability.

BRIEF DESCRIPTION OF THE DRAWINGS

FIG. 4 is a schematic diagram illustrating a data configuration of cache setting information;

FIG. 5 is a schematic diagram illustrating a data configuration of setting management information;

FIG. 6 is a flowchart illustrating an example of a procedure of information processing;

DETAILED DESCRIPTION

According to an embodiment, an information processing device switching between a secure mode and a non-secure mode to operate, includes one or more processors configured to perform: implementing a secure OS which operates in the secure mode; implementing a non-secure OS which operates in the non-secure mode; acquiring initialization process information autonomously in the secure mode, the initialization process information relating to an initialization process which the non-secure OS executes for a shared resource shared by the secure OS and the non-secure OS; and enabling, based on the initialization process information, the shared resource to be shared and used by the secure OS and the non-secure OS.

Hereinafter, exemplary embodiments of an information processing device, a mobile object, an information processing method, and a program will be described with reference to the appended drawings.

First Embodiment

Figure 1:
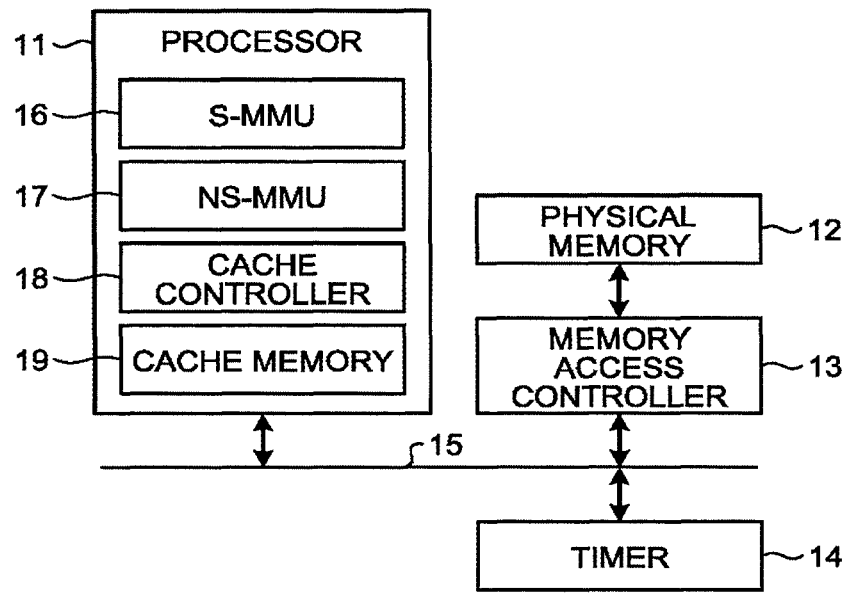
FIG. 1 is a diagram of a hardware configuration example of an information processing device.

FIG. 1 is a diagram illustrating a hardware configuration example of an information processing device 10 in accordance with the present embodiment. The information processing device 10 includes a processor 11, a physical memory 12, a memory access controller 13, and a timer 14. The processor 11, the memory access controller 13, and the timer 14 are connected via a bus 15. The physical memory 12 is connected to the bus 15 via the memory access controller 13.

The processor 11 is one in which a computer system is incorporated as an integrated circuit, and executes various types of control in accordance with a program (software) operating on the computer system. The processor 11 is, for example, a central processing unit (CPU) or a microprocessor.

The physical memory 12 stores various types of data. The physical memory 12 is, for example, a dynamic random access memory (DRAM), a static random access memory (SRAM), a magnetoresistive random access memory (MRAM), or the like.

The memory access controller 13 controls access to the physical memory 12. The timer 14 is a device that performs time counting.

The processor 11 includes an S-memory management unit (MMU) 16, an NS-MMU 17, a cache controller 18, and a cache memory 19.

The S-MMU 16 controls access to a shared resource by an operating system (OS) operating in a secure mode. The NS-MMU 17 controls access to a shared resource by an OS operating in a non-secure mode. The cache controller 18 controls access to the cache memory 19. The secure mode, the non-secure mode, and the shared resource will be described later in detail.

Figure 2:
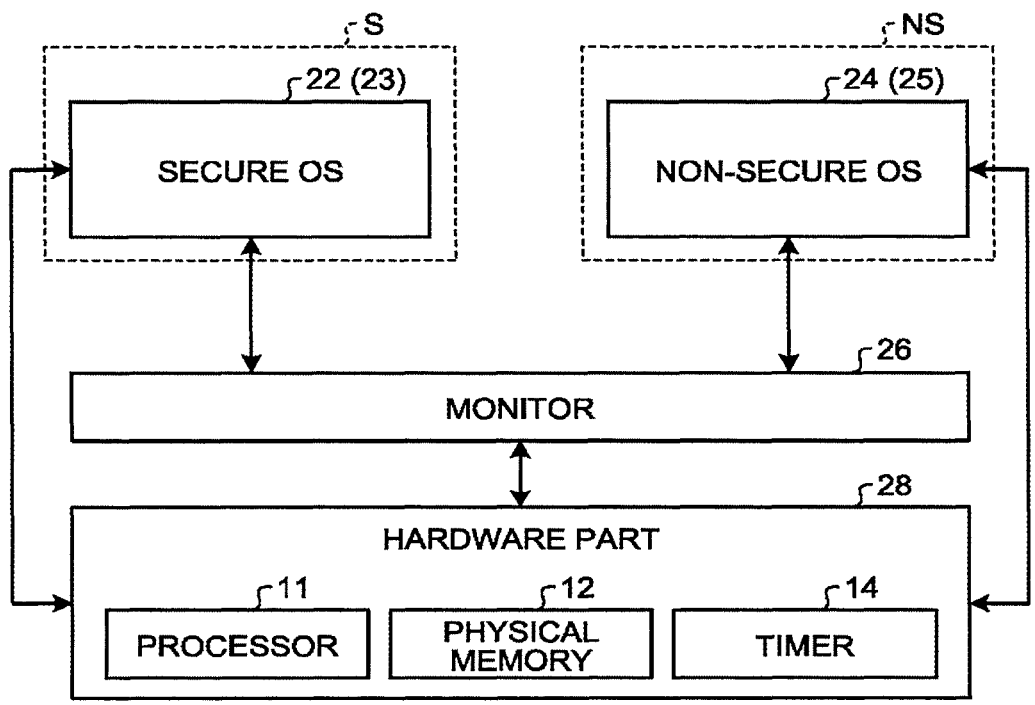
FIG. 2 is a diagram of a functional configuration of the information processing device.

FIG. 2 is a diagram illustrating an overview of a functional configuration of the information processing device 10 of the present embodiment. The information processing device 10 includes a secure OS 22, a non-secure OS 24, a monitor 26, and a hardware part 28.

The hardware part 28 is a part related to hardware in the information processing device 10 and includes the processor 11, the physical memory 12, the timer 14, and the like.

In the present embodiment, the processor 11 has a function of executing a plurality of OSs. In the present embodiment, the processor 11 can execute a program separately in two modes called a secure mode and a non-secure mode. In other words, the processor 11 can cause different OSs or applications to be operated in the secure mode and the non-secure mode, respectively. In other words, the information processing device 10 of the present embodiment performs switching between the secure mode and the non-secure mode and performs an operation.

The secure mode is a mode for causing an OS or an application in which a risk of vulnerability is minimized to be operated. In other words, the secure mode is a mode for causing an OS or application with high security to be operated. Hereinafter, it is referred to as a secure mode S. The non-secure mode is a mode which is more likely to be used with a high function than the secure mode S and causes an OS or application which is large in code scale and prone to vulnerability to be operated. In other words, the non-secure mode is a mode for causing an OS or application with a lower security than the secure mode S to be operated. Hereinafter, it is referred to as a non-secure mode NS.

The information processing device 10 of the present embodiment includes the secure OS 22 as an OS operating in the secure mode S. The secure OS 22 functions when the processor 11 executes the secure OS.

Further, the information processing device 10 includes the non-secure OS 24 as an OS operating in the non-secure mode NS. The non-secure OS 24 functions when the processor 11 executes the non-secure OS.

The monitor 26 functions when the processor 11 executes a monitor program. The monitor 26 switches the mode to the secure mode S or the non-secure mode NS. Specifically, the monitor 26 provides a virtual machine to the secure OS 22 or the non-secure OS 24, and causes the secure OS 22 or the non-secure OS 24 to be operated on the virtual machine. In other words, the monitor 26 performs switching so that either of the secure OS 22 and the non-secure OS 24 is enabled and causes either of the secure OS 22 and the non-secure OS 24 to function. The monitor 26 executes mode switching by calling from the secure OS 22 or the non-secure OS 24 or an interrupt from the hardware part 28 or the like.

In the present embodiment, the shared resource is specified in the information processing device 10 in advance. The shared resource is a resource shared by the secure OS 22 and the non-secure OS 24. The shared resource is, for example, a shared cache region, a shared physical memory region, a shared application, or the like. In other words, the shared resource may be hardware or software. In the present embodiment, a case in which the shared resource is hardware will be described as an example. In the present embodiment, a case in which the shared resource is a shared cache region will be described as an example. The shared cache region is, for example, a level 2 cache (L2 cache) or the like.

Figure 3:
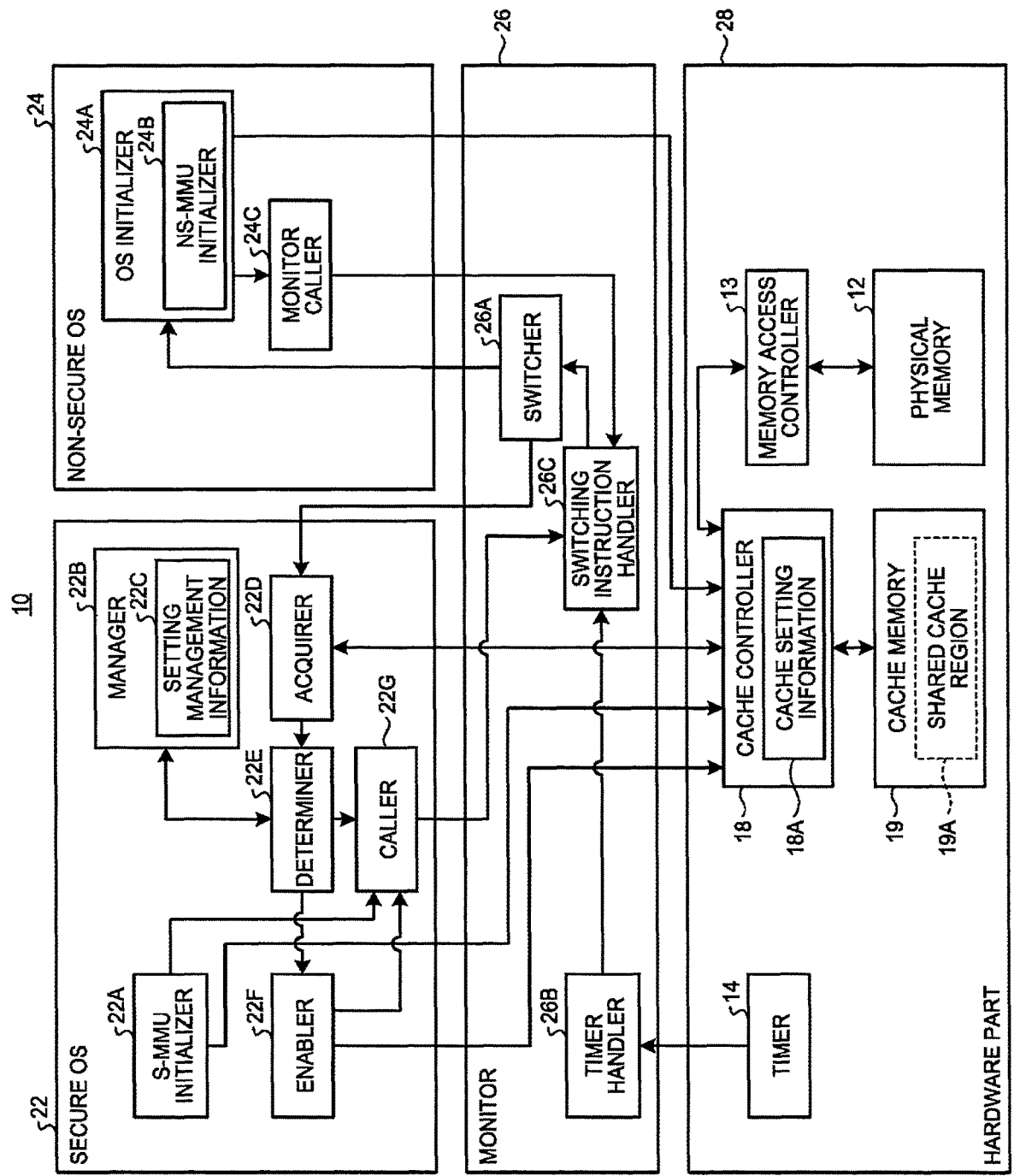
FIG. 3 is a diagram of a functional configuration of the information processing device.

FIG. 3 is a diagram illustrating an example of a functional configuration of the information processing device 10.

The information processing device 10 includes a secure OS 22, a non-secure OS 24, a monitor 26, and a hardware part 28.

The hardware part 28 includes a timer 14, a physical memory 12, a memory access controller 13, a cache controller 18, and a cache memory 19.

A shared cache region 19A is set in the cache memory 19 in advance. The shared cache region 19A is an example of the shared resource.

The cache controller 18 controls access to the cache memory 19. The cache controller 18 stores cache setting information 18A. The cache setting information 18A is information for managing a setting state of a setting item in the shared cache region 19A. The cache setting information 18A will be described later in detail.

Next, the monitor 26 will be described. The monitor 26 comprises a switcher 26A, a timer handler 26B, and a switching instruction handler 26C.

The timer handler 26B receives an interrupt signal from the timer 14. In the present embodiment, the timer 14 notifies the timer handler 26B of an interrupt signal at predetermined time intervals.

The switching instruction handler 26C transmits a mode switching command to the switcher 26A. The switching command is a command which is output from the switching instruction handler 26C to the switcher 26A and used to perform switching from the non-secure mode NS to the secure mode S or from the secure mode S to the non-secure mode NS.

When the switching instruction is receives, the switching instruction handler 26C transmits the mode switching command to the switcher 26A. The switching instruction may be referred to as a secure monitor call (SMC). The switching instruction handler 26C receives the switching instruction from the secure OS 22 and the non-secure OS 24.

The switching instruction is, for example, a first switching instruction or a second switching instruction. The first switching instruction is a switching instruction to switch from the non-secure mode NS to the secure mode S. The second switching instruction is a switching instruction to switch from the secure mode S to the non-secure mode NS.

The switching instruction handler 26C transmits a first switching command to the switcher 26A when it accepts the first switching instruction. The first switching command is a switching command to switch the mode from the non-secure mode NS to the secure mode S. When the first switching command is received, the switcher 26A switches the mode from the non-secure mode NS to the secure mode S. If the mode is switched to the secure mode S, the secure OS 22 becomes operable.

Further, when the second switching instruction is received, the switching instruction handler 26C transmits a second switching command to the switcher 26A. The second switching command is a switching command to switch the mode from the secure mode S to the non-secure mode NS. When the second switching command is received, the switcher 26A switches the mode from the secure mode S to the non-secure mode NS. If the mode is switched to the non-secure mode NS, the non-secure OS 24 becomes operable.

The switching between the non-secure mode NS and the secure mode S by the switcher 26A is specifically performed by rewriting a flag of at least 1 bit included in the hardware part 28. For example, when the flag is "0", it indicates the secure mode S, whereas when the flag is "1", it indicates the non-secure mode NS.

Therefore, when the first switching command is received, the switcher 26A rewrites the flag from "1" indicating the non-secure mode NS to "0" indicating the secure mode S, so that the mode is switched from the non-secure mode NS to the secure mode S. Further, when the second switching command is received, the switcher 26A rewrites the flag from "0" indicating the secure mode S to "1" indicating the non-secure mode NS, so that the mode is switched from the secure mode S to the non-secure mode NS.

Further, when flag is "1", it may indicate the secure mode S, whereas when the flag is "0", it may indicate the non-secure mode NS.

The switcher 26A may further receive a switching command from the timer handler 26B. For example, if the interrupt signal is received from the timer 14, the timer handler 26B may transmit the first switching command for switching to the secure mode S to the switcher 26A. In other words, the switcher 26A may also switch the mode in accordance with the interrupt signal from the timer 14.

Next, the secure OS 22 and the non-secure OS 24 will be described. At the time of activation of the information processing device 10, each of the secure OS 22 and the non-secure OS 24 executes an initialization process such as initialization of an execution environment or setting of resources to be used. In the present embodiment, functional units that function at the time of activation of the information processing device 10 (that is, during the initialization process) will be described. A mode of an initial state of the information processing device 10 is assumed to be the secure mode S. In other words, in the information processing device 10, first, the secure OS 22 executes the initialization process.

First, the secure OS 22 will be described. The secure OS 22 is an OS operating in the secure mode S. The secure OS 22 includes an S-MMU initializer 22A, a manager 22B, an acquirer 22D, a determiner 22E, an enabler 22F, and a caller 22G. In other words, the S-MMU initializer 22A, the manager 22B, the setting management information 22C, the acquirer 22D, the determiner 22E, the enabler 22F, and the caller 22G operate in the secure mode S.

The S-MMU initializer 22A initializes the S-MMU 16 (see FIG. 1). Specifically, the S-MMU initializer 22A initializes the S-MMU 16 upon activation of the information processing device 10. As described above, the S-MMU 16 is a functional unit that controls access to the shared resource by the secure OS 22.

As described above, in the present embodiment, a case in which the shared resource is the shared cache region 19A will be described as an example. Therefore, in the present embodiment, the S-MMU 16 is a functional unit that controls access to the shared cache region 19A by the secure OS 22.

The S-MMU 16 controls access to the shared cache region 19A by the secure OS 22 by performing various types of settings for each in one or more of setting items for the shared cache region 19A.

The S-MMU initializer 22A initializes the S-MMU 16 by registering a predetermined setting value, as an initial setting value, for a setting item which the S-MMU 16 (that is, the secure OS 22) is responsible for a setting among one or more setting items for the shared cache region 19A. The initial setting value is a setting value to be set at the time of the initialization process, and a value thereof is decided in advance for each setting item. In the following description, a case in which the number of setting items for the shared cache region 19A is two or more will be described as an example.

Specifically, the S-MMU initializer 22A initializes the S-MMU 16 by registering a predetermined setting value, as an initial setting value, at a predetermined setting location for each setting item for one or more setting items which the secure OS 22 (the S-MMU 16) is responsible for a setting among a plurality of setting items for the shared cache region 19A.

Here, the cache controller 18 of the hardware part 28 further has a function of managing a setting value set for each of a plurality of setting items for the cache setting information 18A. Specifically, the hardware part 28 manages the setting value set for each setting items using the cache setting information 18A.

FIG. 4 is a schematic diagram illustrating an example of a data configuration of the cache setting information 18A. The cache setting information 18A is a database in which a setting item, responsibility information, a setting location, and a setting value are associated with one another. A data format of the cache setting information 18A is not limited to the database.

The setting item indicates a setting item for the shared resource. As described above, in the present embodiment, the setting item indicates a setting item for the shared cache region 19A.

The responsibility information is information indicating which of the secure OS 22 and the non-secure OS 24 is responsible for setting for a corresponding setting item. Responsibility information "S" indicates that the secure OS 22 is responsible for setting for a corresponding setting item. Responsibility information "NS" indicates that the non-secure OS 24 is responsible for setting for the corresponding setting item.

In other words, in the shared cache region 19A, there are a setting item which the secure OS 22 is responsible for and a setting item which the non-secure OS 24 is responsible for.

The setting location indicates a storage location of a setting value of a corresponding setting item. The setting location is represented by, for example, a first address of a specific storage region in the physical memory 12 or the cache memory 19.

The setting value in the cache setting information 18A indicates a setting value which is currently registered at a setting location of a corresponding setting item.

The cache controller 18 accesses the setting location corresponding to each of the setting items registered in the cache setting information 18A at intervals of predetermined periods of time or at intervals of predetermined timings, and registers the setting value registered at the setting location as in the cache setting information 18A. For this reason, a setting value which is currently registered at the setting location corresponding to each of the setting items specified in the cache setting information 18A is registered in the cache setting information 18A.

Therefore, when the initialization process of the S-MMU 16 by the S-MMU initializer 22A ends, it becomes a state in which the initial setting value is registered as the setting value corresponding to the setting item corresponding to the responsibility information "S" in the cache setting information 18A.

Returning to FIG. 3, the description will be continued. The S-MMU initializer 22A may give a notification of a signal indicating the end of the initialization process of the S-MMU 16 to the cache controller 18 when the initialization process of the S-MMU 16 ends. In this case, when the notification is received, it is desirable for the cache controller 18 to read the setting value set at each setting location corresponding to the responsibility information "S" in the cache setting information 18A and register the setting value in the cache setting information 18A.

If the initialization of the S-MMU 16 ends, the S-MMU initializer 22A gives a notification of the second switching command to switch to the non-secure mode NS to the caller 22G.

When the second switching command is received from the S-MMU initializer 22A, the determiner 22E, or the enabler 22F, the caller 22G gives a notification of the second switching instruction to switch to the non-secure mode NS to the switching instruction handler 26C.

As described above, the switching instruction handler 26C which has received the second switching instruction notifies the switcher 26A of the second switching command. The switcher 26A which has received the second switching command switches the mode from the secure mode S to the non-secure mode NS. Then, the switcher 26A gives a notification of a signal indicating switching to the non-secure mode NS to the non-secure OS 24.

The manager 22B, the setting management information 22C, the acquirer 22D, the determiner 22E, and the enabler 22F in the secure OS 22 will be described later in detail.

Next, the non-secure OS 24 will be described. The non-secure OS 24 is an OS which operates in the non-secure mode NS. In the present embodiment, the non-secure OS 24 has an OS initializer 24A and a monitor caller 24C.

The OS initializer 24A initializes the non-secure OS 24. The OS initializer 24A executes initialization of the non-secure OS 24 when the mode is switched from the secure mode S to the non-secure mode NS at the activation of the information processing device 10.

The OS initializer 24A includes an NS-MMU initializer 24B. The NS-MMU initializer 24B initializes the NS-MMU 17 (see FIG. 1). As described above, the NS-MMU 17 is a functional unit that controls access to the shared cache region 19A by the non-secure OS 24. The NS-MMU 17 controls access to the shared cache region 19A by the non-secure OS 24 by making various types of settings for each of a plurality of setting items for the shared cache region 19A.

The NS-MMU initializer 24B initializes the NS-MMU 17 by registering a predetermined setting value, as the initial setting value, for the setting item which the NS-MMU initializer 24B (that is, the non-secure OS 24) is responsible for among a plurality of setting items for the shared cache region 19A.

Specifically, the NS-MMU initializer 24B initializes the NS-MMU 17 by registering a predetermined setting value, as an initial setting value, at a predetermined setting location for each setting item for the setting item which the non-secure OS 24 (the NS-MMU 17) is responsible for a setting among a plurality of setting items for the shared cache region 19A.

Therefore, the setting values indicating the initial setting values are sequentially registered at the setting locations of the setting items which the non-secure OS 24 (the NS-MMU 17) is responsible for setting in accordance with a progress degree of the initialization process by the NS-MMU initializer 24B.

Here, as described above, the cache controller 18 of the hardware part 28 accesses the setting location corresponding to each of the setting items registered in the cache setting information 18A at intervals of predetermined periods of time or at intervals of predetermined timings, and registers the setting value registered at the setting location in the cache setting information 18A.

For this reason, the setting value predetermined as the initial setting value is sequentially registered in the cache setting information 18A in accordance with the progress degree of the initialization process of the NS-MMU 17 by the NS-MMU initializer 24B (see FIG. 4).

If the initialization process of the non-secure OS 24 ends, the OS initializer 24A notifies the monitor caller 24C of the first switching command. The monitor caller 24C which has received the first switching command notifies the switching instruction handler 26C of the first switching instruction.

Further, there are cases in which the switcher 26A switches the mode from the non-secure mode NS to the secure mode S during the initialization process of the NS-MMU 17 by the NS-MMU initializer 24B. For example, the switcher 26A switches the mode from the non-secure mode NS to the secure mode S in accordance with the interrupt signal from the timer 14.

In this case, the mode is switched from the non-secure mode NS to the secure mode S in the middle of the initialization process by the NS-MMU initializer 24B, that is, even when there is a setting item in which the initial setting value is not set.

Next, the acquirer 22D, the determiner 22E, and the enabler 22F of the secure OS 22 will be described.

The acquirer 22D autonomously acquires the initialization process information in the secure mode S. The initialization process information is information related to the initialization process which the non-secure OS 24 (NS-MMU initializer 24B) executes for the shared cache region 19A. The acquiring autonomously means acquiring the initialization process information at a timing of the acquirer 22D side without triggering any reception signal such as receiving a signal related to the end of the initialization from the non-secure OS 24.

For example, the initialization process information indicates the progress degree of the initialization process for the shared cache region 19A by the non-secure OS 24. In the present embodiment, the acquirer 22D autonomously acquires the initialization process information from the cache controller 18.

As described above, the setting value predetermined as the initial setting value is sequentially registered in the cache setting information 18A in accordance with the progress degree of the initialization process of the NS-MMU 17 by the NS-MMU initializer 24B. Further, a setting value having a value different from the initial setting value is registered in the setting item in which the initial setting value is not set in the cache setting information 18A.

Therefore, the acquirer 22D autonomously acquires the initialization process information indicating the progress degree of the initialization process by reading the setting value of the setting item corresponding to the responsibility information "NS" from the cache setting information 18A of the cache controller 18. In other words, the acquirer 22D acquires the setting value set at the setting location of the setting item which the non-secure OS 24 is responsible for among a plurality of setting items for the shared cache region 19A as the initialization process information.

Next, the determiner 22E will be described. The determiner 22E determines whether or not the initialization process information acquired by the acquirer 22D satisfies an enabling condition of the shared cache region 19A (shared resource). The enabling condition indicates a condition for enabling the shared cache region 19A so that both the secure OS 22 and the non-secure OS 24 can be used. The enabling condition may be decided in advance.

For example, the determiner 22E determines whether or not the progress degree of the initialization process for the shared cache region 19A by the non-secure OS 24 (the NS-MMU initializer 24B) satisfies the enabling condition.

In the present embodiment, the determiner 22E determines whether or not the enabling condition is satisfied using the initialization process information acquired from the acquirer 22D and the setting management information 22C managed by the manager 22B.

The manager 22B manages the setting management information 22C. The setting management information 22C is information for managing the setting state of the initial setting value for each of the setting items of the shared cache region 19A which is the shared resource.

FIG. 5 is a schematic diagram illustrating an example of a data configuration of the setting management information 22C. The setting management information 22C is a database in which the setting item, the responsibility information, the setting location, the initial setting value, and the set information are associated with one another. A data format of the setting management information 22C is not limited to the database. The setting management information 22C may be information in which the setting item, the responsibility information, the setting location, and the initial setting value are associated with one another or may be a format including no set information. In the present embodiment, the setting management information 22C will be described using a format including the set information as an example.

As described above, the initial setting value is a setting value to be set at the time of the initialization process and is a value set in advance for each setting item. The responsibility information, the setting information, and the initial setting value corresponding to each of the setting items for the shared cache region 19A are registered in the setting management information 22C in advance. The initial setting value registered in the setting management information 22C is a setting value to be set at the time of the initialization process decided in advance for a corresponding setting item.

The set information is information indicating whether or not the corresponding setting item has been initialized. In the present embodiment, "set" indicating completion of setting is registered or "not set" indicating "not yet set" is registered as the "set information". The set information is updated by the determiner 22E.

In a case in which the setting value serving as the initialization process information acquired from the shared cache region 19A has the same value as the initial setting value corresponding to the setting item of the setting value, the determiner 22E registers "set" in the setting information corresponding to the setting item. Further, in a case in which the setting value serving as initialization process information acquired from the shared cache region 19A has a value different from the initial setting value corresponding to the setting item of the setting value, the determiner 22E registers "not set" in the set information corresponding to the setting item.

Therefore, the progress degree is indicated by a ratio of the setting item in which the set information "set" is registered among the setting items corresponding to the responsibility information "NS" in the setting management information 22C. In other words, the progress degree is indicated by a ratio which is indicated by the initialization process information acquired by the acquirer 22D, that is, a ratio at which the setting value set at the setting location of the setting item which the non-secure OS 24 is responsible for coincides with the setting value for the setting item which the non-secure OS 24 is responsible for in the setting management information 22C.

Further, the determiner 22E determines whether or not the progress degree indicated by the ratio satisfies the enabling condition. In the present embodiment, the determiner 22E determines that the enabling condition is satisfied if the progress degree indicated by the ratio is a threshold value or more. The threshold value may be decided in advance in accordance with content of the setting item registered in the setting management information 22C or the like. For example, it is desirable to increase a threshold value (a threshold value closer to 100%) as the ratio of the setting item indicating setting content necessary for enabling the shared cache region 19A in the setting management information 22C increases. Specifically, the threshold value is 50%, 60%, 70%, 80%, 90%, 100%, or the like but is not limited to these values.

In other words, the determiner 22E determines that the enabling condition is satisfied in a case in which the progress degree indicated by the initialization process information acquired by the acquirer 22D indicates that the initial setting values corresponding to all the setting items which the non-secure OS 24 is responsible for in the setting management information 22C are set at the setting locations.

Therefore, the determiner 22E determines that the enabling condition is satisfied when the initialization process by the NS-MMU initializer 24B ends.

The enabler 22F enables the shared cache region 19A to be shared and used by the secure OS 22 and the non-secure OS 24 on the basis of the initialization process information acquired by the acquirer 22D. Specifically, when the determiner 22E determines that the enabling condition is satisfied on the basis of the initialization process information, the enabler 22F enables the shared cache region 19A.

Specifically, the enabler 22F notifies the cache controller 18 of the enabling command of the shared cache region 19A. The cache controller 18 which has received the enabling command, enables the shared cache region 19A of the cache memory 19 to be shared and used by the secure OS 22 and the non-secure OS 24.

The enabler 22F may notify the caller 22G of the second switching command after the shared cache region 19A is enabled.

Next, an example of a procedure of information processing executed by the information processing device 10 of the present embodiment will be described.

FIG. 6 is a flowchart illustrating an example of a procedure of information processing executed by the information processing device 10. The information processing device 10 executes the procedure of information processing illustrated in FIG. 6 when the information processing device 10 is activated.

First, the S-MMU initializer 22A initializes the S-MMU 16 (Step S100). Then, the caller 22G of the secure OS 22 notifies the switching instruction handler 26C of the second switching instruction. The switching instruction handler 26C which has received the second switching instruction notifies the switcher 26A of the second switching command.

The switcher 26A which has received the second switching command switches the mode from the secure mode S to the non-secure mode NS (Step S102).

Then, the NS-MMU initializer 24B starts the initialization process of the NS-MMU 17 (Step S104).

Then, the switcher 26A repeats negative determination until it is determined that the first switching command for switching to the secure mode S is received from the switching instruction handler 26C (Step S106: No). As described above, the switching instruction handler 26C notifies the switcher 26A of the first switching command when the first switching instruction to the secure mode S is received from any one of the caller 22G, the monitor caller 24C, and the timer handler 26B.

If positive determination is performed in Step S106 (Step S106: Yes), the process proceeds to Step S108. In Step S108, the switcher 26A switches the mode from the non-secure mode NS to the secure mode S (Step S108).

Then, the acquirer 22D acquires the initialization process information from the cache controller 18 (Step S110).

Then, the determiner 22E determines whether or not the enabling condition of the shared cache region 19A is satisfied using the initialization process information acquired in Step S110 and the setting management information 22C (Step S112).

If it is determined that the enabling condition is not satisfied (Step S112: No), the process returns to Step S102. On the other hand, if it is determined that the enabling condition is satisfied (Step S112: Yes), the process proceeds to Step S114.

In Step S114, the enabler 22F enables the shared cache region 19A (Step S114). Then, the present routine ends.

As described above, the information processing device 10 of the present embodiment performs switching between the secure mode S and the non-secure mode NS and performs an operation. The information processing device 10 includes the secure OS 22 and the non-secure OS 24. The secure OS 22 operates in the secure mode S. The non-secure OS 24 operates in the non-secure mode NS. In the secure mode S, the acquirer 22D autonomously acquires the initialization process information related to the initialization process which the non-secure OS 24 executes for the shared cache region 19A (shared resource) shared by the secure OS 22 and the non-secure OS 24. The enabler 22F enables the shared cache region 19A (shared resource) to be shared and used by the secure OS 22 and the non-secure OS 24 on the basis of the initialization process information.

As described above, in the present embodiment, the information processing device 10 enables the shared resource (the shared cache region 19A) on the basis of the initialization process information autonomously acquired when the acquirer 22D is in the secure mode S. Therefore, the secure OS 22 need not execute the process related to the activation of the shared resource in accordance with the signal output from the non-secure OS 24 with a low security to the secure OS 22. In other words, the information processing device 10 can enable the shared resource on the basis of the initialization process information autonomously acquired in the secure mode S without waiting for the signal from the non-secure OS 24 with a low security which is more susceptible to vulnerability than the secure OS 22.

Therefore, the information processing device 10 of the present embodiment can improve the reliability.

Further, the information processing device 10 of the present embodiment can complete the process of enabling the shared cache region 19A on the secure OS 22 side. Therefore, it is unnecessary to provide a function of transmitting a signal related to enabling the shared cache region 19A from the non-secure OS 24 to the secure OS 22. Therefore, in addition to the above effects, the information processing device 10 of the present embodiment can improve the reliability with a simple configuration.

In the present embodiment, a configuration in which the secure OS 22 includes the acquirer 22D has been described as an example. However, the present embodiment is not limited to the example in which the acquirer 22D is installed in the secure OS 22 as long as the acquirer 22D autonomously acquires the initialization process information in the secure mode S. For example, the secure OS 22 may be installed in the hardware part 28.

Further, the shared resource may notify the secure OS 22 of the initialization process information. In other words, the acquirer 22D may acquire the initialization process information given in notification from the shared resource (that is, the cache controller 18).

In this case, for example, when the non-secure OS 24 accesses the cache setting information 18A which is the shared resource, it is desirable for the cache controller 18 to cause an interrupt to be generated and notifies the switching instruction handler 26C of the monitor 26 of the interrupt. Then, upon receiving the interrupt, it is desirable for the switching instruction handler 26C to notify the switcher 26A of the first switching command for switching the mode from the non-secure mode NS to the secure mode S. Accordingly, the switcher 26A switches the mode from the non-secure mode NS to the secure mode S. With such a process, the shared resource can notify the secure OS 22 of the initialization process information.

First Modified Example

In the present embodiment, a case in which the manager 22B manages the setting management information 22C for the shared cache region 19A has been described as an example. However, there are cases in which the information processing device 10 use a plurality of shared resources shared by the secure OS 22 and the non-secure OS 24. In this case, it is desirable for the manager 22B to manage the setting management information 22C corresponding to each of a plurality of shared resources, and at this time, it is desirable for the cache controller 18 to manage the cache setting information 18A corresponding to each of a plurality of shared resources.

Then, it is desirable for the secure OS 22 selects the corresponding setting management information 22C and the cache setting information 18A for each shared resource and performs the above process.

Second Modified Example

Further, the manager 22B may manage the setting management information 22C in accordance with a type of hardware including a shared resource. In this case, the manager 22B may manage the setting management information 22C for each type of hardware including a shared resource. Similarly, the cache controller 18 may manage the cache setting information 18A for each type of hardware including a shared resource.

Then, it is desirable for the secure OS 22 selects the corresponding setting management information 22C and the cache setting information 18A for each type of hardware including a shared resource and performs the above process.

Third Modified Example

There are cases in which the security function of the non-secure OS 24 for at least one setting item which the non-secure OS 24 is responsible for does not satisfy a corresponding security level set for each setting item in advance. In this case, the determiner 22E may notify the non-secure OS 24 of an operation end instruction without enabling the shared cache region 19A. It is desirable to register the security level corresponding to the setting item in, for example, the setting management information 22C in advance. The operation end instruction is, for example, a shutdown instruction. Determination of whether or not the security level is satisfied can be performed using a known method.

Second Embodiment

In the present embodiment, an example in which the initialization process by the NS-MMU initializer 24B is executed on the secure OS 22 side will be described.

Figure 7:
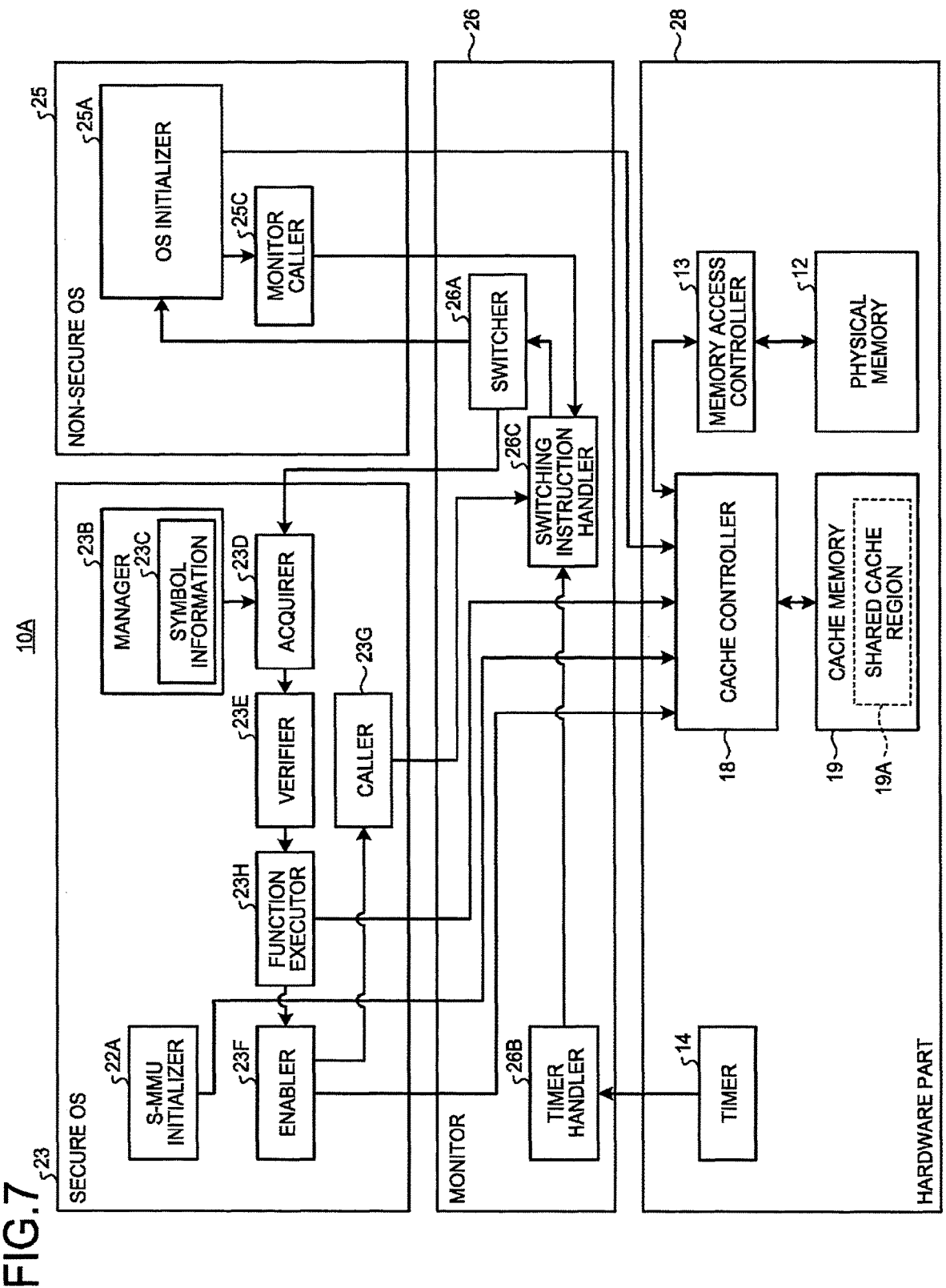
FIG. 7 is a diagram of a functional configuration of an information processing device.

FIG. 7 is a diagram illustrating an example of a functional configuration of an information processing device 10A of the present embodiment. The same functions as those of the information processing device 10 of the first embodiment are denoted by the same reference numerals, and detailed description thereof will be omitted.

The information processing device 10A includes a secure OS 23, a non-secure OS 25, a monitor 26, and a hardware part 28.

The monitor 26 and the hardware part 28 are similar to those of the information processing device 10 of the first embodiment. Further, an overview of a hardware configuration and a functional configuration of the information processing device 10A is similar to that of the information processing device 10 of the first embodiment (see FIGS. 1 and 2).

In other words, the information processing device 10A is similar to the information processing device 10 of the first embodiment except that it includes a secure OS 23 and a non-secure OS 25 instead of the secure OS 22 and the non-secure OS 24 as illustrated in FIG.

Similarly to the non-secure OS 24, the non-secure OS 25 is an OS which operates in a non-secure mode NS. The non-secure OS 25 includes an OS initializer 25A and a monitor caller 25C.

The OS initializer 25A initializes the non-secure OS 25. The OS initializer 25A initializes the non-secure OS 25 when the mode is switched from the secure mode S to the non-secure mode NS at the time of activation of the information processing device 10A.

The OS initializer 25A is similar to the OS initializer 24A of the first embodiment. Here, the OS initializer 25A does not include the NS-MMU initializer 24B. In other words, the OS initializer 25A does not include the NS-MMU initializer 24B which initializes the NS-MMU 17 (see FIG. 1). In other words, the OS initializer 25A initializes the non-secure OS 25 in addition to the initialization process for the NS-MMU 17.

If the initialization of the non-secure OS 25 ends, the OS initializer 25A gives a notification of the first switching command for switching to the secure mode S to the monitor caller 25C. The monitor caller 24C which has received the first switching command gives a notification of the first switching instruction to switch the mode from the non-secure mode NS to the secure mode S to the switching instruction handler 26C.

Next, the secure OS 23 will be described. The secure OS 23 is an OS which operates in the secure mode S. The secure OS 23 includes an S-MMU initializer 22A, a manager 22B, an acquirer 23D, a verifier 23E, an enabler 23F, a caller 23G, and a function executor 23H. In other words, the S-MMU initializer 22A, the manager 22B, the acquirer 23D, the verifier 23E, the enabler 23F, the caller 23G, and the function executor 23H operate in the secure mode S.

The S-MMU initializer 22A initializes the S-MMU 16 (see FIG. 1). The S-MMU initializer 22A is similar to that of the first embodiment.

The manager 22B manages symbol information 23C. The symbol information 23C is information indicating a storage location of a function for executing the initialization process which the non-secure OS 25 executes for the shared cache region 19A.

The initialization process is an initialization process executed by the NS-MMU initializer 24B (refer to the first embodiment) as described in the first embodiment. In other words, the initialization process is a process of registering the setting value predetermined as the initial setting value for the setting item which the non-secure OS 25 is responsible for a setting among a plurality of setting items for the shared cache region 19A.

The manager 22B may be installed in the non-secure OS 25.

The acquirer 23D autonomously acquires the initialization process information. The initialization process information is information related to the initialization process as described in the first embodiment.

In the present embodiment, the acquirer 23D acquires the symbol information 23C as the initialization process information.

The verifier 23E reads the function stored at the storage location from the storage location indicated by the symbol information 23C acquired by the acquirer 23D. The verifier 23E verifies whether or not the read function is executable.

For example, the verifier 23E verifies whether or not the function is executable by verifying execution contents of the function stored at the storage location indicated in the symbol information 23C.

Further, for example, the verifier 23E verifies whether or not the function is executable by authenticating whether or not the function stored at the storage location indicated by the symbol information 23C is a valid function. The valid function indicates a function for executing the initialization process executed on the shared cache region 19A, and indicates a function which is not altered.

When the verifier 23E verifies that the function is executable, the function executor 23H executes the function. As the function is executed by the verifier 23E, the setting value predetermined as the initial setting value is registered at the storage location of the setting item which the non-secure OS 25 is responsible for a setting among a plurality of setting items for the shared cache region 19A.

Further, when the function is executed by the function executor 23H, the enabler 23F enables the shared cache region 19A.

The caller 23G is similar to the caller 22G of the first embodiment. In the present embodiment, the caller 23G receives the second switching command from the enabler 22F. Then, when the second switching command is received, the verifier 23E gives a notification of the second switching instruction for switching to the non-secure mode NS to the switching instruction handler 26C.

Next, an example of a procedure of information processing executed by the information processing device 10A of the present embodiment will be described.

Figure 8:
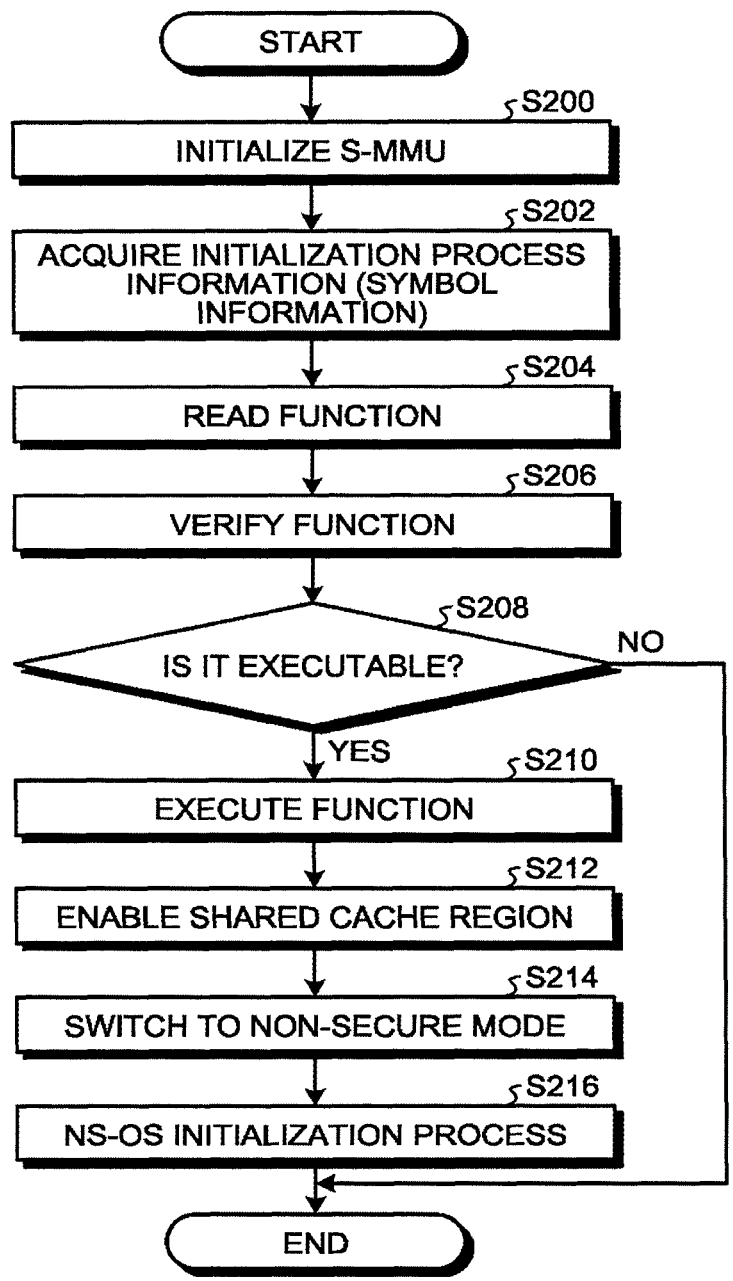
FIG. 8 is a flow chart of a procedure of information processing.

FIG. 8 is a flowchart illustrating an example of a procedure of information processing executed by the information processing device 10A. When the information processing device 10A is activated, the information processing device 10A executes a procedure of information processing illustrated in FIG. 8.

First, the S-MMU initializer 22A initializes the S-MMU 16 (Step S200).

Then, the acquirer 23D acquires the symbol information 23C from the manager 23B as the initialization process information (Step S202).

Then, the verifier 23E reads the function stored at the storage location from the storage location indicated by the symbol information 23C acquired in Step S202 (Step S204). Then, the verifier 23E verifies whether or not the read function is executable (Step S206).

When it is verified that the function is executable by the verification of Step S206 (Step S208: Yes), the process proceeds to Step S210. When it is verified that the function is not executable (Step S208: No), the present routine ends.

In Step S210, the function executor 23H executes the function verified in Step S206 (Step S210). With the process of Step S210, the setting value predetermined as the initial setting value is registered at the storage location of the setting item which the non-secure OS 25 is responsible for a setting among a plurality of setting items for the shared cache region 19A.

Then, the caller 23G enables the shared cache region 19A (Step S212).

Then, the switcher 26A switches the mode from the secure mode S to the non-secure mode NS (Step S214). Then, the OS initializer 25A executes the initialization process of the non-secure OS 25 (Step S216). Then, the present routine ends.

As described above, the information processing device 10A of the present embodiment includes the acquirer 23D, the verifier 23E, the function executor 23H, and the enabler 23F. The acquirer 23D acquires the symbol information 23C indicating the storage location of the function for executing the initialization process executed by the non-secure OS 25 as the initialization process information. The verifier 23E verifies whether or not the function stored at the storage location indicated by the symbol information 23C is executable. When it is verified that the function is executable, the function executor 23H executes the function. When the function is executed, the enabler 23F enables the shared cache region 19A (shared resource).

As described above, in the present embodiment, the secure OS 23 enables the shared resource (the shared cache region 19A) on the basis of the autonomously acquired initialization process information. Therefore, the secure OS 23 need not execute the process related to enabling the shared resource in accordance with the signal output from the non-secure OS 25 with a low security to the secure OS 23. In other words, the secure OS 23 can enable the shared resource without waiting for the signal from the non-secure OS 25.

Therefore, the information processing device 10A of the present embodiment can improve the reliability.

Fourth Modified Example

In the second embodiment, the manager 22B manages the symbol information 23C. A case in which the symbol information 23C is information indicating the storage location of the function for executing the initialization process which the non-secure OS 25 executes for the shared cache region 19A has been described.

However, the symbol information 23C may be information indicating a parameter of the function. In this case, the acquirer 23D acquires the symbol information 23C indicating the parameter of the function as the initialization process information.

In this case, the verifier 23E reads the parameter of the function stored at the storage location from the storage location indicated by the symbol information 23C acquired by the acquirer 23D. Then, it is desirable for the verifier 23E to verify whether or not the function in which the read parameter is introduced is executable.

Similarly to the second embodiment, it is desirable for the enabler 23F to enable the shared cache region 19A when the function is executed by the function executor 23H.

Further, as described in the first modified example, in the information processing device 10A, a plurality of shared resources may be shared by the secure OS 22 and the non-secure OS 24. In this case, it is desirable for the information processing device 10A to use the information indicating the storage location of the function or the parameter of the function corresponding to each of a plurality of shared resources as the symbol information 23C.

Further, it is desirable that the acquirer 23D acquire the symbol information 23C indicating the storage location of the function or the parameter of the function corresponding to the shared resource to be initialized as the initialization process information, and the enabler 23F enable the shared cache region 19A to be initialized.

Similarly to the second modified example, the information processing device 10A may manage the above function for each type of hardware including a shared resource. In this case, it is desirable for the information processing device 10A to use the information indicating the storage location of the function or the parameter of the function corresponding to a type of hardware including a shared resource as the symbol information 23C.

Fifth Modified Example

The information processing device 10 and the information processing device 10A of the above embodiments can be applied to various types of systems. For example, the information processing device 10 and the information processing device 10A of the above embodiments can be applied to an in-vehicle network system installed in an automobile which is an example of a mobile object.

For example, the information processing device 10 and the information processing device 10A of the above embodiments can be applied to an in-vehicle gateway device (hereinafter abbreviated as a "GW") included in the in-vehicle network system.

Figure 9:
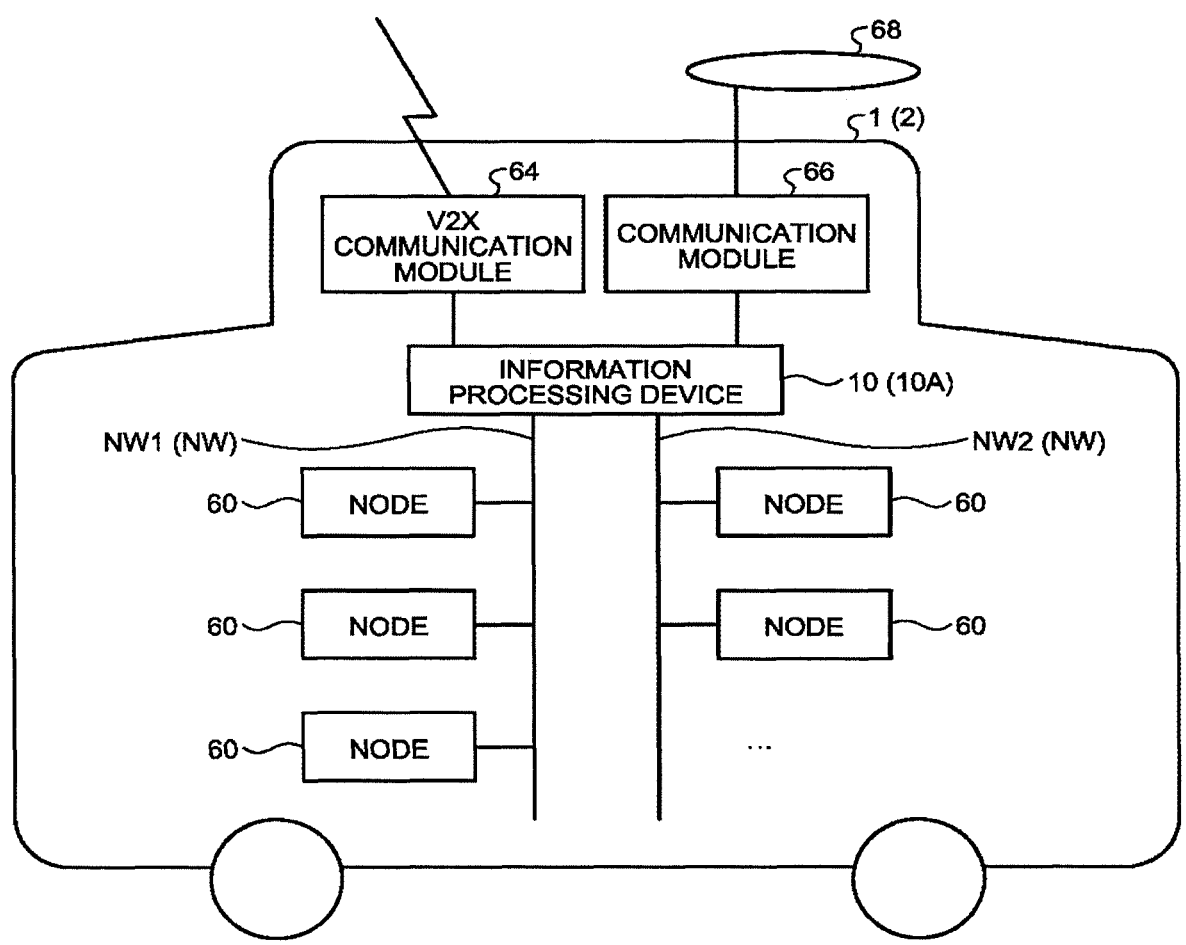
FIG. 9 is a schematic diagram of an information processing system.

FIG. 9 is a schematic diagram illustrating an overview of an information processing system 1. The information processing system 1 is installed in, for example, a vehicle 2.

The information processing system 1 includes an information processing device 10 and a plurality of nodes 60. The information processing system 1 may be configured to include the information processing device 10A instead of the information processing device 10.

The information processing device 10 and a plurality of nodes 60 are connected via a network NW. In the example illustrated in FIG. 9, the information processing system 1 includes a plurality of sub networks (a sub network NW1 and a sub network NW2) as the network NW. The node 60 is connected to each of the plurality of sub networks. Further, a plurality of sub networks are connected to the information processing device 10.

A V2X communication module 64 and a communication module 66 are connected to the information processing device 10. The communication module 66 is a module for performing communication with an external device via an external network 68. The V2X communication module 64 is a module for performing direct wireless communication with other vehicles 2 without going through a communication infrastructure. For direct wireless communication, for example, inter-vehicle/road-to-vehicle communication (V2X: vehicle-to-everything) is used. The V2X communication is also referred to as C2X (Car-to-X) communication.

FIG. 9 illustrates a case in which the information processing device 10 is configured as a GW as an example. In the present embodiment, the information processing device 10 may perform the above-described process in addition to a function of an original gateway. Examples of the function of the original gateway include relaying and filtering of communication between the sub networks (for example, the sub network NW1 and the sub network NW2) in the information processing system 1, relaying and filtering of communication between the information processing system 1 and the external network 68 outside the vehicle, and relaying and filtering of direct communication with other vehicles 2.

The node 60 is an electronic device that communicates data with other nodes 60 via the information processing device 10. Examples of the node 60 include an electronic control unit (ECU), various types of sensors, and actuators. The ECU is an electronic device that performs various types of controls in the vehicle 2.

A communication standard of the information processing system 1 is not limited. Examples of the communication standard of the information processing system 1 include a controller area network (CAN) and FlexRay (registered trademark).

As described above, the information processing device 10 and the information processing device 10A of the above embodiments may be applied to the information processing system 1 installed in the mobile object such as the vehicle 2.

In this case, it is desirable for the information processing device 10 to execute the information process illustrated in FIG. 6 when an engine of the vehicle 2 is activated. Similarly, when the information processing device 10A is installed, it is desirable for the information processing device 10A to execute the information process illustrated in FIG. 9 when the engine of the vehicle 2 is activated.

Supplementary Description

The program for executing each of the above-described processes executed by the information processing device 10 and the information processing device 10A of the above embodiments may be stored in a hard disk drive (HDD). Further, the program for executing each of the above-described processes executed by the information processing device 10 and the information processing device 10A of the above embodiments may be provided in a form in which it is embedded in a ROM in advance.

The program for executing the above-described processes executed by the information processing device 10 and the information processing device 10A of the above embodiments may be provided as a computer program product in a form in which it is stored in a computer readable storage medium such as a compact disc read only memory (CD-ROM), a compact disc-recordable (CD-R), a memory card, a digital versatile disk (DVD), or a flexible disk (FD) in a file having an installable format or an executable format. Further, the program for executing the above-described processes executed by the information processing device 10 and the information processing device 10A of the above embodiments may be stored in a computer connected to a network such as the Internet and provided by downloading via the network. Further, the program for executing the above-described processes executed by the information processing device 10 and the information processing device 10A of the above embodiments may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device switching between a secure mode and a non-secure mode to operate, comprising:
   one or more processors configured to perform:
   implementing a secure OS which operates in the secure mode;
   implementing a non-secure OS which operates in the non-secure mode;
   acquiring initialization process information autonomously in the secure mode, the initialization process information relating to an initialization process which the non-secure OS executes for a shared resource shared by the secure OS and the non-secure OS; and
   enabling, based on the initialization process information, the shared resource to be shared and used by the secure OS and the non-secure OS.

2. The device according to claim 1, wherein the secure OS performs the acquiring and the enabling.

3. The device according to claim 1, wherein
   the secure OS further performs determining whether or not a progress degree of the initialization process for the shared resource by the non-secure OS satisfies an enabling condition of the shared resource, the progress degree of the initialization process being indicated by the initialization process information, and
   at the enabling, the one or more processors enable the shared resource when it is determined that the enabling condition is satisfied.

4. The device according to claim 3, wherein
   the secure OS further performs managing setting management information in which a setting item for the shared resource, responsibility information indicating which of the secure OS and the non-secure OS is responsible for setting for the setting item, a setting location of a setting value of the setting item, and an initial setting value for the setting item are associated with one another,
   at the acquiring, the one or more processors acquire, as the initialization process information, a setting value set at a setting location of a setting item for which the non-secure OS is responsible, among one or more setting items for the shared resource, and
   at the determining, the secure OS determines whether or not the enabling condition is satisfied by the progress degree indicated by a ratio at which setting values set at setting locations of setting items for which the non-secure OS is responsible coincide with initial setting values for the setting items in the setting management information, the setting values being indicated by the acquired initialization process information.

5. The device according to claim 4, wherein at the determining, the secure OS determines that the enabling condition is satisfied when the progress degree indicates that the initial setting values corresponding to all the setting items for which the non-secure OS is responsible, in the setting management information are already set at the setting location.

6. The device according to claim 4, wherein
   the shared resource includes a plurality of shared resources, and
   at the managing, the secure OS manages the setting management information corresponding to each of the plurality of shared resources.

7. The device according to claim 4, wherein at the managing, the secure OS manages the setting management information corresponding to a type of hardware having the shared resource.

8. The device according to claim 4, wherein at the determining, the secure OS notifies the non-secure OS of an operation end instruction without enabling the shared resource when a security function of the non-secure OS for at least one setting item for which the non-secure OS is responsible, does not satisfy a corresponding security level set in advance for each setting item.

9. The device according to claim 1, wherein
at the acquiring, the one or more processors acquire, as the initialization process information, symbol information indicating a storage location of a function for executing the initialization process executed by the non-secure OS,
the non-secure OS performs:
verifying whether or not the function stored at the storage location is executable; and
executing the function when it is verified that the function is executable, and
at the enabling, the one or more processors enable the shared resource when the function is executed.

10. The device according to claim 9, wherein at the verifying, the non-secure OS verifies whether or not the function is executable by verifying execution contents of the function stored at the storage location.

11. The device according to claim 9, wherein at the verifying, the non-secure OS verifies whether or not the function is executable by authenticating whether or not the function stored at the storage location is a valid function.

12. The device according to claim 1, wherein
at the acquiring, the one or more processors acquire, as the initialization process information, symbol information indicating a storage location of a parameter of a function for executing the initialization process executed by the non-secure OS,
the non-secure OS performs:
verifying whether or not the function in which the parameter stored at the storage location is introduced is executable; and
executing the function when it is verified that the function is executable, and
at the enabling, the one or more processors enable the shared resource when the function is executed.

13. A mobile object comprising:
an information processing device switching between a secure mode and a non-secure mode to operate, wherein
the information processing device comprises:
one or more processors configured to perform:
implementing a secure OS which operates in the secure mode;
implementing a non-secure OS which operates in the non-secure mode;
acquiring initialization process information autonomously in the secure mode, the initialization process information relating to an initialization process which the non-secure OS executes for a shared resource shared by the secure OS and the non-secure OS; and
enabling, based on the initialization process information, the shared resource to be shared and used by the secure OS and the non-secure OS.

14. An information processing method executed by an information processing device switching between a secure mode and a non-secure mode to operate, comprising:
acquiring initialization process information autonomously in the secure mode, the initialization process information relating to an initialization process which a non-secure OS operating in the non-secure mode executes for a shared resource shared by a secure OS operating in the secure mode and the non-secure OS; and
enabling, based on the initialization process information, the shared resource to be shared and used by the secure OS and the non-secure OS.

15. A computer program product comprising a computer-readable medium including programmed instructions executed by a computer of an information processing device switching between a secure mode and a non-secure mode to operate, the instructions causing the computer to execute:
acquiring initialization process information autonomously in the secure mode, the initialization process information relating to an initialization process which a non-secure OS operating in the non-secure mode executes for a shared resource shared by a secure OS operating in the secure mode and the non-secure OS; and
enabling, based on the initialization process information, the shared resource to be shared and used by the secure OS and the non-secure OS.

* * * * *